(12) United States Patent
Pan (10) Patent No.: US 12,511,485 B2
(45) Date of Patent: Dec. 30, 2025

(54) SOUND EFFECT ADDING METHOD AND APPARATUS, STORAGE MEDIUM, AND ELECTRONIC DEVICE

(71) Applicant: Beijing Bytedance Network Technology Co., Ltd., Beijing (CN)

(72) Inventor: Junjie Pan, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 567 days.

(21) Appl. No.: 18/003,016

(22) PCT Filed: Jun. 23, 2021

(86) PCT No.: PCT/CN2021/101704
§ 371 (c)(1),
(2) Date: Dec. 22, 2022

(87) PCT Pub. No.: WO2021/259300
PCT Pub. Date: Dec. 30, 2021

(65) Prior Publication Data
US 2023/0259712 A1    Aug. 17, 2023

(30) Foreign Application Priority Data

Jun. 23, 2020 (CN) .......................... 202010583097.9

(51) Int. Cl.
*G06F 40/00* (2020.01)
*G06F 40/216* (2020.01)
*G06F 40/30* (2020.01)

(52) U.S. Cl.
CPC ............ *G06F 40/30* (2020.01); *G06F 40/216* (2020.01)

(58) Field of Classification Search
CPC ...... G10L 25/63; G10L 13/027; G10L 13/033; G10L 13/08; G10L 2013/083;
(Continued)

(56) References Cited

U.S. PATENT DOCUMENTS 6,385,581 B1    5/2002  Stephenson
11,133,025 B2 *  9/2021  Raikar ................... G10L 15/26
(Continued)

FOREIGN PATENT DOCUMENTS

CN     106383815 A    2/2017
CN     107515855 A   12/2017
(Continued)

OTHER PUBLICATIONS

Zhang, Tong, and C-CJ Kuo. "Classification and retrieval of sound effects in audiovisual data management." Conference Record of the Thirty-Third Asilomar Conference on Signals, Systems, and Computers (Cat. No. CH37020). vol. 1. IEEE, 1999. (Year: 1999).*
(Continued)

*Primary Examiner* — Edgar X Guerra-Erazo
(74) *Attorney, Agent, or Firm* — Astute IP Law Group (57) ABSTRACT

The present invention relates to a sound effect adding method and apparatus, a storage medium, and an electronic device. The method comprises: determining, on the basis of an emotion judgment model, a statement emotion label of each statement of a text to be processed; determining an emotion offset value of said text on the basis of the type of emotion labels which are largest in quantity among the multiple statement emotion labels; for each paragraph of said text, determining an emotion distribution vector of the paragraph according to the statement emotion label of at least one statement corresponding to the paragraph; determining emotion probability distribution of the paragraph on the basis of the emotion offset value and the emotion
(Continued)

distribution vector corresponding to the paragraph; determining, according to the emotion probability distribution of the paragraph and sound effect emotion labels of multiple sound effects in a sound effect library, a target sound effect matching the paragraph; and adding the target sound effect to an audio position corresponding to the paragraph in an audio file corresponding to said text. Thus, the effect of automatically selecting and adding sound effects can be implemented, and the efficiency of adding sound effects can be improved.

20 Claims, 4 Drawing Sheets

(58) Field of Classification Search
CPC . G10L 13/10; G10L 2013/105; G10L 13/086; G10L 15/222; G10L 2015/221; G10L 15/22; G10L 2015/223; G10L 2015/228; G10L 2015/227; G10L 15/26; G10L 25/30; G10L 21/0216; G10L 2021/02161; G10L 2021/02168; G10L 25/03; G06F 3/017; G06F 3/018; G06F 3/04842; G06F 40/20; G06F 40/253; G06F 40/274; G06N 3/044; G06N 3/045; G06N 3/0455; G06N 3/0464; G06N 3/047; G06N 3/0475; G06N 3/048; G06N 3/096; G06N 3/094; G06N 3/092; G06N 3/091; G06N 3/09; G06N 3/0895; G06N 3/088; G06N 3/098; G06N 3/0985
See application file for complete search history.

(56) References Cited

U.S. PATENT DOCUMENTS

| | | | |
|---|---|---|---|
| 11,688,416 B2* | 6/2023 | Raikar | G10L 15/02 704/235 |
| 2006/0122834 A1* | 6/2006 | Bennett | G10L 15/1822 704/E15.047 |
| 2015/0042662 A1 | 2/2015 | Latorre-Martinez et al. | |
| 2018/0032305 A1* | 2/2018 | Cameron | G06F 40/30 |
| 2018/0077095 A1* | 3/2018 | Deyle | G06T 13/205 |
| 2020/0086496 A1* | 3/2020 | Shin | B25J 11/0005 |
| 2020/0135158 A1 | 4/2020 | Yao et al. | |
| 2021/0074261 A1* | 3/2021 | Yang | G10L 13/033 |
| 2021/0125608 A1* | 4/2021 | Weir | G10L 15/22 |

FOREIGN PATENT DOCUMENTS

| | | |
|---|---|---|
| CN | 108153831 A | 6/2018 |
| CN | 108829672 A | 11/2018 |
| CN | 109241331 A | 1/2019 |
| CN | 109658917 A | 4/2019 |
| CN | 110083829 A | 8/2019 |
| CN | 110399603 A | 11/2019 |
| CN | 110751208 A | 2/2020 |
| CN | 111767740 A | 10/2020 |
| JP | 2003337592 A | 11/2003 |

OTHER PUBLICATIONS

Office Action in CN202010583097.9, mailed Nov. 29, 2023, 13 pages.
International Search Report for International Patent Application No. PCT/CN2021/101704, mailed Aug. 30, 2021 (5 pages).

* cited by examiner

SOUND EFFECT ADDING METHOD AND APPARATUS, STORAGE MEDIUM, AND ELECTRONIC DEVICE

The present application is a 35 U.S.C. § 371 National Phase of PCT Application No. PCT/CN2021/101704, titled "SOUND EFFECT ADDING METHOD AND APPARATUS, STORAGE MEDIUM, AND ELECTRONIC DEVICE", filed on Jun. 23, 2021, which claims the priority to Chinese patent application No. 202010583097.9, titled "SOUND EFFECT ADDING METHOD AND APPARATUS, STORAGE MEDIUM, AND ELECTRONIC DEVICE", filed on Jun. 23, 2020 with the China National Intellectual Property Administration, the disclosures of which are incorporated herein by reference in their entireties.

FIELD

The present disclosure relates to the field of text processing, and in particular to a method and an apparatus for adding a sound effect, a storage medium, and an electronic device.

BACKGROUND

When a text is converted into an audio book, various sound effects is usually added to the audio book to enhance an atmosphere of the audio book. However, there are various types of sound effects, and which kind of sound effects should be added to which part of the audio book depends on text content.

In a traditional method for adding a sound effect, it is required to manually analyze a plot of a whole text, and select the sound effect from a sound effect library one by one based on text content and insert the selected sound effect into the audio book. In the case of mass production of audio novels, this method requires a lot of labor cost, which is time-consuming and labor-intensive. Moreover, due to the manual selection of the sound effect having obvious bias, a repetition rate of the sound effect is very high, which affects a sound effect quality of the audio text.

SUMMARY

The summary is provided to introduce concepts in a simplified form that are described in detail in the following detailed description. The summary is not intended to identify key features or essential features of the claimed technical solution, nor is it intended to limit the scope of the claimed technical solution.

In a first aspect, a method for adding a sound effect is provided according to an embodiment of the present disclosure. The method includes: determining statement emotion labels of all statements in a to-be-processed text based on an emotion determination model; determining an emotion offset value of the to-be-processed text based on an emotion label type with a largest number of the statement emotion labels; determining, for each paragraph in the to-be-processed text, an emotion distribution vector of the paragraph based on the statement emotion label of at least one statement of the paragraph; determining an emotion probability distribution of the paragraph based on the emotion offset value and the emotion distribution vector of the paragraph; determining a target sound effect matching the paragraph based on the emotion probability distribution of the paragraph and sound effect emotion labels of multiple sound effects in a sound effect library; and adding the target sound effect to an audio position corresponding to the paragraph in an audio file of the to-be-processed text.

In a second aspect, an apparatus for adding a sound effect is provided according to an embodiment of the present disclosure. The apparatus includes a statement determination module configured to determine statement emotion labels of all statements in a to-be-processed text based on an emotion determination model; an offset determination module configured to determine an emotion offset value of the to-be-processed text based on an emotion label type with a largest number of the statement emotion labels; a distribution determination module configured to determine, for each paragraph in the to-be-processed text, an emotion distribution vector of the paragraph based on the statement emotion label of at least one statement of the paragraph; a probability determination module configured to determine an emotion probability distribution of the paragraph based on the emotion offset value and the emotion distribution vector of the paragraph; a sound effect determination module configured to determine a target sound effect matching the paragraph based on the emotion probability distribution of the paragraph and sound effect emotion labels of multiple sound effects in a sound effect library; and a sound effect addition module configured to add the target sound effect to an audio position corresponding to the paragraph in an audio file of the to-be-processed text.

In a third aspect, a computer readable medium storing a computer program is provided according to an embodiment of the present disclosure. The program, when executed by a processing apparatus, implements steps of the method according to any one of the first aspect of the embodiments of the present disclosure.

In a fourth aspect, an electronic device is provided according to an embodiment of the present disclosure. The electronic device includes a storage apparatus and a processing apparatus. The storage apparatus stores a computer program. The processing apparatus is configured to execute the computer program in the storage apparatus to implement steps of the method according to any one of the first aspect of the embodiments of the present disclosure.

Through the above technical solutions, at least the following technical effects can be achieved.

Emotions of a whole text and each paragraph may be identified by an emotion determination model. For each paragraph, a sound effect may be determined, which is consistent with the emotion of the whole text and the emotion of the paragraph. Therefore, the sound effect can be automatically selected and added, thus improving an efficiency of adding the sound effect. In this way, the sound effect can be added to the audio text in batches, and an atmosphere of the audio text can be improved.

Other features and advantages of the present disclosure will be described in detail in the following detailed description.

BRIEF DESCRIPTION OF THE DRAWINGS

In conjunction with the drawings and with reference to the following embodiments, the above and other features, advantages and aspects of the embodiments of the present disclosure are more apparent. The same or similar reference numerals throughout the drawings represent the same or similar elements. It should be understood that the drawings are schematic and the components and elements are unnecessarily drawn to scale. In the drawings.

DETAILED DESCRIPTION OF EMBODIMENTS

The embodiments of the present disclosure are described in detail below with reference to the drawings. Although some embodiments of the present disclosure are shown in the drawings, it should be understood that the present disclosure may be implemented in various forms and should not be limited to the embodiments. The embodiments are provided for thoroughly and completely understanding the present disclosure. It should be understood that the drawings and the embodiments of the present disclosure are exemplary and are not intended to limit the protection scope of the embodiments of the present disclosure.

It should be understood that the steps in the method embodiments of the embodiments of the present disclosure may be performed in different orders and/or in parallel. In addition, the method embodiments may include an additional step and/or an omitted step that is not shown herein. The scope of the embodiments of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that concepts such as "first" and "second" mentioned in the embodiments of the present disclosure are only used to distinguish different apparatuses, modules or units, and are not intended to limit an sequential order or interdependence of the functions performed by the apparatuses, modules or units.

It should be noted that the modifications such as "one" and "multiple" mentioned in the embodiments of the present disclosure are illustrative and not restrictive. Those skilled in the art should understand that the modifications should be understood as "one or more" unless otherwise expressly indicated in the context.

The names of messages or information exchanged between multiple apparatuses in the embodiments of the present disclosure are only for illustrative purposes, and are not intended to limit the scope of the messages or information.

Figure 1:
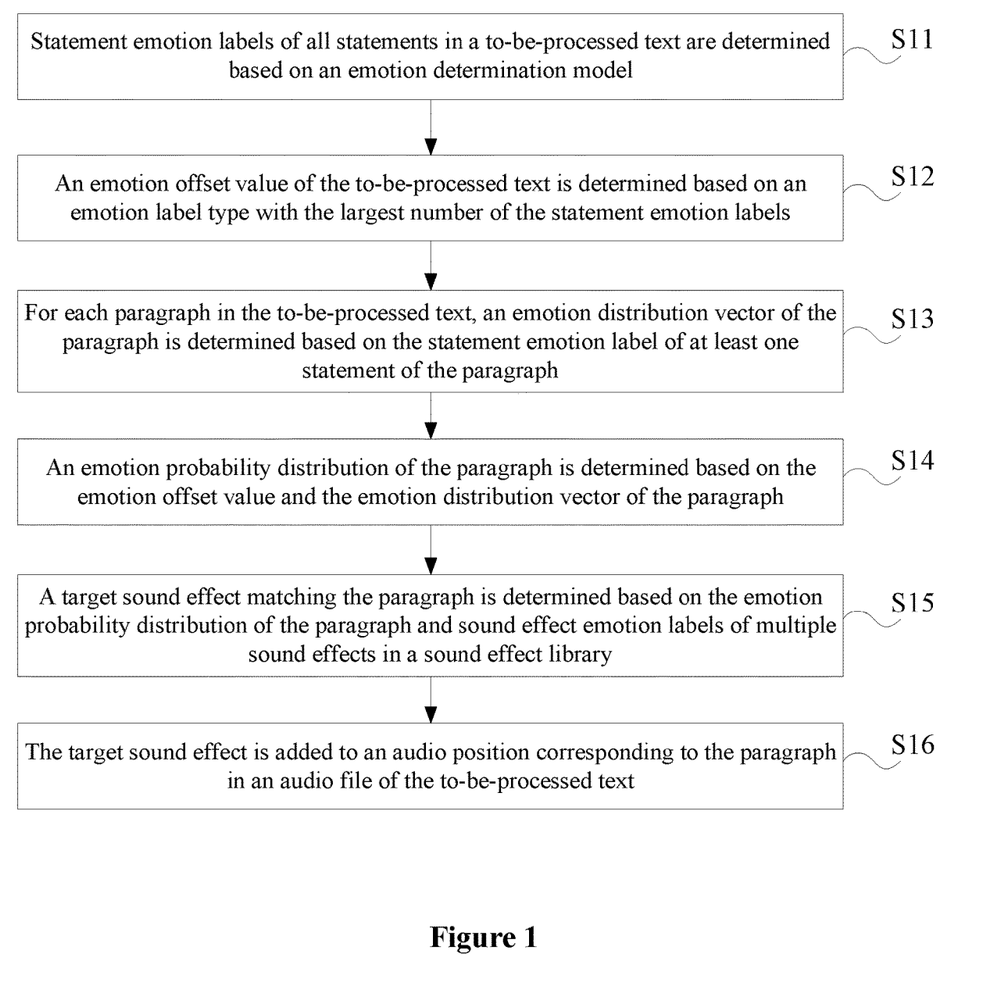
FIG. 1 is a flowchart of a method for adding a sound effect according to an exemplary embodiment of the present disclosure.

FIG. 1 is a flowchart of a method for adding a sound effect according to an exemplary embodiment of the present disclosure. As shown in FIG. 1, the method for adding the sound effect includes the following steps S11 to S16.

In S11, statement emotion labels of all statements in a to-be-processed text are determined based on an emotion determination model.

Statement emotion labels may be first-level labels which are unrelated to each other. For example, label 1 may represent "happiness", label 2 may represent "fear", and label 3 may represent "surprise". Statement emotion labels may also be multi-level labels which have a dependency relationship. For example, label 1 may represent "boredom", label 2 may represent "disgust", and label 3 may represent "hatred". Both label 1 and label 3 may be dependent on label 2 which represents the "disgust" emotion. Label 4 may represent "incomprehension", label 5 may represent "surprise", and label 6 may represent "astonishment". Both label 4 and label 6 may be dependent on label 3 which represents the "surprise" emotion. It should be noted that when a statement is determined to have no obvious emotional bias, it may be labeled as a "neutral emotion".

It should be noted that in a process of determining the emotion of each statement in the to-be-processed text by the emotion determination model, an input to the emotion determination model may be the to-be-processed text. The emotion determination model determines the emotions of the statements by analyzing semantics of words and generates the emotion labels. In another embodiment, the input to the emotion determination model may be an audio file corresponding to the to-be-processed text that has been voiced (for example, text reading, novel dubbing, etc.). The emotion determination model determines the emotion label of the statements by analyzing a voice emotion of a reciter and/or determining semantics of speech.

One statement may correspond to one or multiple statement emotion labels, which will not be limited in the embodiment of the present disclosure.

In S12, an emotion offset value of the to-be-processed text is determined based on an emotion label type with the largest number of the statement emotion labels.

By determining a mode emotion label in the whole text, that is, an emotion label type with a largest number of the statement emotion labels, an emotion offset value of the whole text may be determined to characterize an emotional tone of the whole text. For example, in the case of the whole text with 100 statements, 100 statement emotion labels are determined based on the whole text, among which the emotion label type of 70 statement emotion labels is "sad", the emotion label type of 20 statement emotion labels is "confused", and the emotion label type of 10 statement emotion labels is "angry". In this case, the mode emotion label in the whole text may be determined as "sad", which indicates that the emotional tone of the whole text is "sad".

Therefore, the emotion offset value may be determined based on the emotion label type with the largest number. The emotion offset value is used to weight a label value of each emotion label type in the whole text. That is, the emotion offset value is used to weight an emotion label corresponding to a keynote emotion of the whole text. A specific weighted value may be flexibly set based on an actual application situation. For example, since a novel text has a strong emotional bias, the novel text may be set to have a high emotion offset value, to increase the weight of the keynote emotion in subsequent steps. In this way, the generated sound effect is more in line with the keynote emotion of the whole text. However, since a literature text has a weak emotional bias, the literature text may be set to have a low emotion offset value, so as to avoid overweighting the content irrelevant to the keynote emotion in the literature and avoid an inappropriate sound effect.

In S13, for each paragraph in the to-be-processed text, an emotion distribution vector of the paragraph is determined based on the statement emotion label of at least one statement of the paragraph.

The whole text has emotional bias, and each paragraph may have its own emotional bias. For a paragraph, the number of different statement emotion labels in the paragraph may be determined as a score of a vectorized value, to determine an emotion distribution vector of the paragraph. For example, there are five kinds of statement emotion labels. In one paragraph, there are three "happy" labels, four "sad" labels, two "angry" labels, one "surprised" label and ten "neutral" labels. An emotion distribution vector of the paragraph may be determined as V1=[3,4,2,1,10], where each score represents the number of labels of the emotion label type corresponding to the score position.

In S14, an emotion probability distribution of the paragraph is determined based on the emotion offset value and the emotion distribution vector of the paragraph.

The emotion offset value is used to weight the emotion distribution vector. For example, in a case that the emotion offset value is characterized by weighting a happy label, the score characterizing "happiness" in the emotion distribution vector may be increased.

In an embodiment, a target emotion distribution vector may be determined, by superposing the emotion offset value with a score of an emotion label type corresponding to the emotion offset value in the emotion distribution vector of the paragraph. The target emotion distribution vector is converted into the emotion probability distribution of the paragraph in a preset conversion rule.

For example, the emotion offset value may be "offset= [0.2,0,0,0,0]", which indicates adding 0.2 to a first score (i.e., a score characterizing happiness) of the emotion distribution vector. Then, a target emotion distribution vector may be obtained as V2=[3,4,2,1,10]+[0.2,0,0,0,0]=[3.2,4,2,1,10].

The weighted emotion distribution vector may be converted into an emotion distribution probability. In an embodiment, a ratio of each score of the weighted emotion distribution vector to a total score thereof may be determined as a distribution probability of the score. For example, for the weighted emotion distribution vector V2= [3.2,4,2,1,10], a distribution probability of the first score is 3.2/20.2=0.158, a distribution probability of the second score is 4/20.2=0.198, a distribution probability of the third score is 2/20.2=0.099, a distribution probability of the fourth score is 1/20.2=0.05, and a distribution probability of the fifth score is 10/20.2=0.495. Therefore, the emotion distribution probability V3 may be determined as [0.158, 0.198, 0.099, 0.050, 0.495].

In S15, a target sound effect matching the paragraph is determined based on the emotion probability distribution of the paragraph and sound effect emotion labels of multiple sound effects in a sound effect library.

After the emotion distribution probability is determined, a statement emotion label with the highest probability in the emotion distribution probability may be determined as a target label. A sound effect with a sound effect emotion label consistent with the target label is searched from the sound effect library as the sound effect of the paragraph.

In an embodiment, it is also possible to sample the sound effect library based on the emotion distribution probability. For example, in the case that a distribution probability of "happy" is 0.5, a distribution probability of "expectation" is 0.4, and a distribution probability of "surprise" is 0.1, a sampling result of the sound effect is as follows: a 50% chance of sound effect with sound effect emotion label "happy", a 40% chance of sound effect with sound effect emotion label "expectation" and a 10% chance of sound effect with sound effect emotion label "surprise".

It should be noted that there may be multiple sound effects corresponding to one sound effect emotion label in the sound effect library. When a sound effect with a certain sound effect emotion label is selected, one sound effect may be randomly selected as the target sound effect from the multiple sound effects with the same sound effect emotion label. In this way, the selection of sound effects is not constrained by artificial preference, and is more abundant.

In an embodiment, it is also possible to determine, from the sound effect library, a sound effect with a length matching a text length and a sound effect emotion label in conformity to the emotion distribution probability. For example, when a sound effect of an emotion label with a highest distribution probability is determined and a sound effect length corresponding to a length of a current paragraph is 10 seconds, a sound effect, which has a sound effect emotion label in consistent with the emotion label with the highest distribution probability and a length closest to 10 seconds, may be determined as the target sound effect from the sound effect library.

An audio length matching the paragraph may be determined based on the number of words in the paragraph. If the input to the emotion determination model is an audio file, a time axis of the sampled paragraph may be directly determined, to calculate the audio length of the sampled paragraph.

In S16, the target sound effect is added to an audio position corresponding to the paragraph in an audio file of the to-be-processed text.

For example, a time axis corresponding to the paragraph is "00:01:1100:02:01". The target sound effect may be inserted into the time axis of the audio file of the time axis. For example, the target sound effect may be inserted into any optional position, such as the beginning, the end and the middle, of the time axis. A specific insertion position is not limited in the embodiment of the present disclosure.

Through the above technical solutions, at least the following technical effects can be achieved.

Emotions of a whole text and each paragraph may be identified by an emotion determination model. For each paragraph, a sound effect may be determined, which is consistent with the emotion of the whole text and the emotion of the paragraph. Therefore, the sound effect can be automatically selected and added, thus improving an efficiency of adding the sound effect. In this way, the sound effect can be added to the audio text in batches, and an atmosphere of the audio text can be improved.

Figure 2:
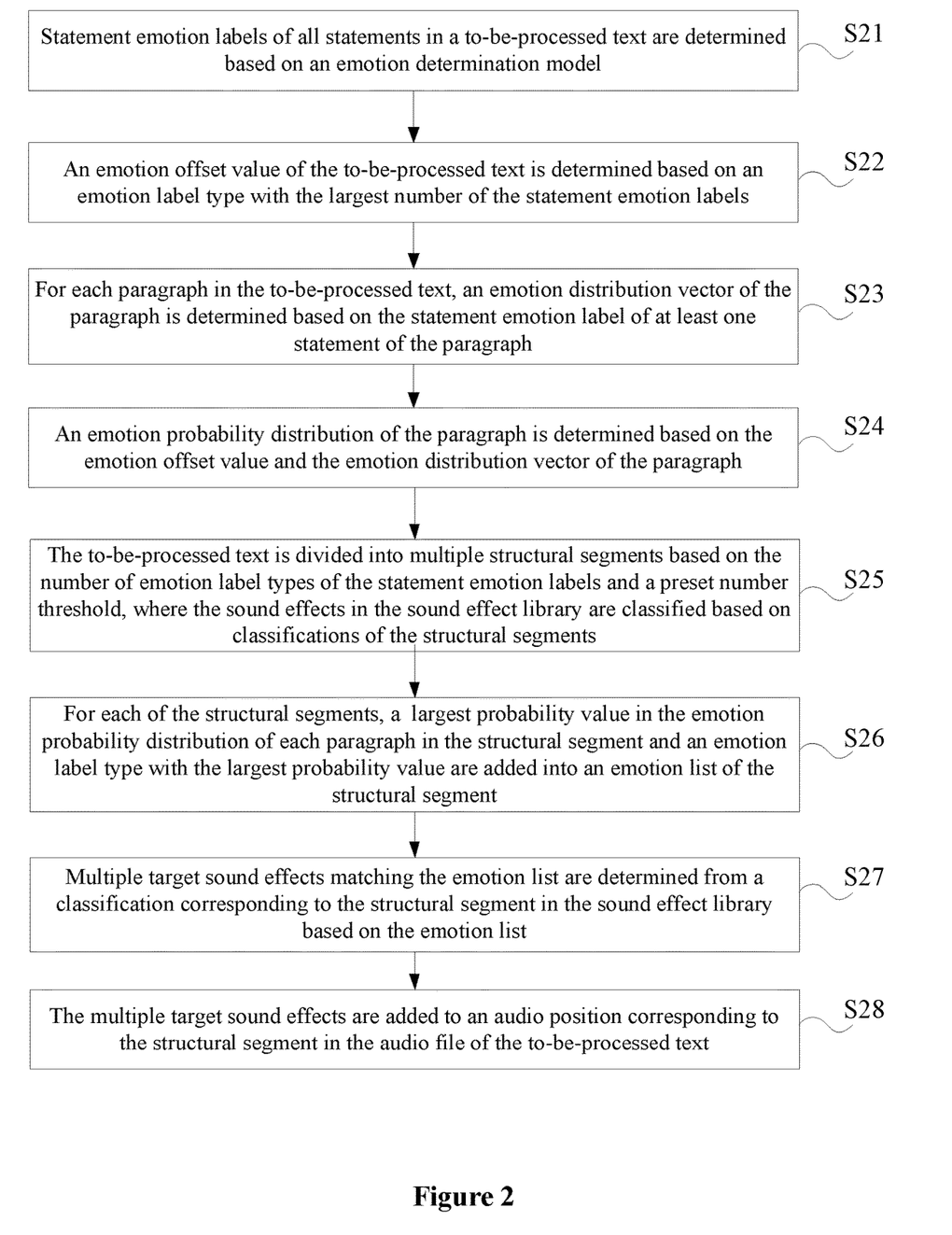
FIG. 2 is a flowchart of a method for adding a sound effect according to an exemplary embodiment of the present disclosure.

FIG. 2 is a flowchart of a method for adding a sound effect according to an exemplary embodiment of the present disclosure. As shown in FIG. 2, the method for adding the sound effect includes the following steps S21 to S28.

In S21, statement emotion labels of all statements in a to-be-processed text are determined based on an emotion determination model.

Statement emotion labels may be first-level labels which are unrelated to each other. For example, label 1 may represent "happiness", label 2 may represent "fear", and label 3 may represent "surprise". Statement emotion labels may also be multi-level labels which have a dependency relationship. For example, label 1 may represent "boredom", label 2 may represent "disgust", and label 3 may represent "hatred". Both label 1 and label 3 may be dependent on label 2 which represents the "disgust" emotion. Label 4 may represent "incomprehension", label 5 may represent "surprise", and label 6 may represent "astonishment". Both label 4 and label 6 may be dependent on label 3 which represents the "surprise" emotion. It should be noted that when a statement is determined to have no obvious emotional bias, it may be labeled as a "neutral emotion".

It should be noted that in a process of determining the emotion of each statement in the to-be-processed text by the emotion determination model, an input to the emotion determination model may be the to-be-processed text. The emotion determination model determines the emotions of the statements by analyzing semantics of words and generates the emotion labels. In another embodiment, the input to the emotion determination model may be an audio file corresponding to the to-be-processed text that has been voiced (for example, text reading, novel dubbing, etc.). The emotion determination model determines the emotion label of the statements by analyzing a voice emotion of a reciter and/or determining semantics of speech.

One statement may correspond to one or multiple statement emotion labels, which will not be limited in the embodiment of the present disclosure.

In S22, an emotion offset value of the to-be-processed text is determined based on an emotion label type with the largest number of the statement emotion labels.

By determining a mode emotion label in the whole text, that is, an emotion label type with a largest number of the statement emotion labels, an emotion offset value of the whole text may be determined to characterize an emotional tone of the whole text. For example, in the case of the whole text with 100 statements, 100 statement emotion labels are determined based on the whole text, among which the emotion label type of 70 statement emotion labels is "sad", the emotion label type of 20 statement emotion labels is "confused", and the emotion label type of 10 statement emotion labels is "angry". In this case, the mode emotion label in the whole text may be determined as "sad", which indicates that the emotional tone of the whole text is "sad".

Therefore, the emotion offset value may be determined based on the emotion label type with the largest number. The emotion offset value is used to weight a label value of each emotion label type in the whole text. That is, the emotion offset value is used to weight an emotion label corresponding to a keynote emotion of the whole text. A specific weighted value may be flexibly set based on an actual application situation. For example, since a novel text has a strong emotional bias, the novel text may be set to have a high emotion offset value, to increase the weight of the keynote emotion in subsequent steps. In this way, the generated sound effect is more in line with the keynote emotion of the whole text. However, since a literature text has a weak emotional bias, the literature text may be set to have a low emotion offset value, so as to avoid over-weighting the content irrelevant to the keynote emotion in the literature and avoid an inappropriate sound effect.

In S23, for each paragraph in the to-be-processed text, an emotion distribution vector of the paragraph is determined based on the statement emotion label of at least one statement of the paragraph.

The whole text has emotional bias, and each paragraph may have its own emotional bias. For a paragraph, the number of different statement emotion labels in the paragraph may be determined as a score of a vectorized value, to determine an emotion distribution vector of the paragraph. For example, there are five kinds of statement emotion labels. In one paragraph, there are three "happy" labels, four "sad" labels, two "angry" labels, one "surprised" label and ten "neutral" labels. An emotion distribution vector of the paragraph may be determined as V1=[3,4,2,1,10], where each score represents the number of labels of the emotion label type corresponding to the score position.

In S24, an emotion probability distribution of the paragraph is determined based on the emotion offset value and the emotion distribution vector of the paragraph.

The emotion offset value is used to weight the emotion distribution vector. For example, in a case that the emotion offset value is characterized by weighting a happy label, the score characterizing "happiness" in the emotion distribution vector may be increased.

In an embodiment, a target emotion distribution vector may be determined, by superposing the emotion offset value with a score of an emotion label type corresponding to the emotion offset value in the emotion distribution vector of the paragraph.

For example, the emotion offset value may be "offset=[0.2,0,0,0,0]", which indicates adding 0.2 to a first score (i.e., a score characterizing happiness) of the emotion distribution vector. Then, a target emotion distribution vector may be obtained as V2=[3,4,2,1,10]+[0.2,0,0,0,0]=[3.2,4,2,1,10].

The weighted emotion distribution vector may be converted into an emotion distribution probability. In an embodiment, a ratio of each score of the weighted emotion distribution vector to a total score thereof may be determined as a distribution probability of the score. For example, for the weighted emotion distribution vector V2=[3.2,4,2,1,10], a distribution probability of the first score is 3.2/20.2=0.158, a distribution probability of the second score is 4/20.2=0.198, a distribution probability of the third score is 2/20.2=0.099, a distribution probability of the fourth score is 1/20.2=0.05, and a distribution probability of the fifth score is 10/20.2=0.495. Therefore, the emotion distribution probability V3 may be determined as [0.158, 0.198, 0.099, 0.050, 0.495].

In S25, the to-be-processed text is divided into multiple structural segments based on the number of emotion label types of the statement emotion labels and a preset number threshold, where the sound effects in the sound effect library are classified based on classifications of the structural segments.

The text may have different structure parts, such as foreshadowing, main body, climax, transition, and ending. Each structure part may include multiple paragraphs, and one or more paragraphs belonging to the same structure part consist of a structural segment. The text may be divided into different structural segments based on the number of emotion label types. For example, ten kinds of statement emotion labels may be set as a number threshold. From a beginning paragraph of the text, several consecutive paragraphs including at least ten kinds of statement emotion labels are determined as one designated structural segment (such as foreshadowing segment); and from a next paragraph, several consecutive paragraphs including at least ten kinds of statement emotion labels are determined as another designated structural segment (such as main body segment). Alternatively, different number thresholds may be set for different structural segments. For example, a number threshold of foreshadowing segment may be five, a number threshold of main body segment may be seven, and a number threshold of climax segment may be fifteen. Then, from a beginning paragraph of the text, several consecutive paragraphs including at least five kinds of statement emotion labels may be determined as the foreshadowing segment; from a next paragraph, several consecutive paragraphs including at least seven kinds of statement emotion labels may be determined as the main body segment; and then from a next paragraph, several consecutive paragraphs including at least fifteen kinds of statement emotion labels may be determined as the climax segment.

It should be noted that the number threshold for dividing structural segments may be set based on the number of emotion label types of the statement emotion labels in the whole text, so that the structural segments are divided more efficiently.

The sound effects in the sound effect library have two kinds of attribute labels. One is a sound effect emotion label, that is, a label type corresponding to the statement emotion label. The other is a structure label, which indicates a text structure to which the sound effect is applied.

In S26, for each of the structural segments, a largest probability value in the emotion probability distribution of each paragraph in the structural segment and an emotion label type with the largest probability value are added into an emotion list of the structural segment.

In consideration of a continuous emotion of the text and an emotional connection between paragraphs, there may be abrupt sound effects in a case that the paragraphs are cut separately to determine the emotion. Therefore, an emotion list may be set in units of structural segments to express an emotional bias of the structural segment.

For example, a structural segment includes five paragraphs. In the structural segment, an emotion probability distribution of the paragraph 1 is [0.5,0.1,0.1,0.1,0.1], an emotion probability distribution of the paragraph 2 is [0.1, 0.21,0.1,0.29,0.1], an emotion probability distribution of the paragraph 3 is [0.1,0.5,0.1,0.1,0.1], an emotion probability distribution of the paragraph 4 is [0.1,0.1,0.4,0.2,0.1], an emotion probability distribution of the paragraph 5 is [0.1, 0.1,0.4,0.15,0.15]. The emotion label types represented by respective score positions of the emotion probability distribution are [happy, sad, surprised, touched, disgusted]. Then, "happy: 0.5" may be extracted from the paragraph 1 to be added into the emotion list, "touched: 0.29" may be extracted from the paragraph 2 to be added into the emotion list, "sad: 0.5" may be extracted from the paragraph 3 to be added into the emotion list, "surprised: 0.4" may be extracted from the paragraph 4 to be added into the emotion list, and "surprised: 0.4" may be extracted from the paragraph 5 to be added into the emotion list. The finally obtained emotion list is "happy: 0.5, sad: 0.5, surprised: 0.8, touched: 0.29, disgusted: 0".

In S27, multiple target sound effects matching the emotion list are determined from a classification corresponding to the structural segment in the sound effect library based on the emotion list.

Multiple target sound effects may be determined from multiple sound effects corresponding to the structural segment based on the emotion list. The number of target sound effects may be related to the number of paragraphs in the structural segment, or may be preset for the structural segment.

In an embodiment, each of the structural segments further corresponds to the preset number of sound effects. On the basis of multiple emotion label types and probability values corresponding to the multiple emotion label types in the emotion list, the multiple target sound effects are determined from the classification corresponding to the structural segment in the sound effect library based on a preset matching condition. The number of target sound effects is equal to the preset number of sound effects.

For example, in a case that the number of target sound effects is set to 3 and the emotion list is "happy: 0.5, sad: 0.5, surprised: 0.8, touched: 0.29, disgusted: 0", sound effects corresponding to emotion label types with the first three high probability values may be selected as the target sound effects. That is, the sound effects corresponding to the three emotion label types of "surprised", "happy" and "sad" may be selected as the target sound effects.

In an embodiment, a sampling rate of the emotion label type in the emotion list may also be determined based on the probability value in the emotion list. For example, in the case that the emotion list is "happy: 0.5, sad: 0.5, surprised: 0.8, touched: 0.29, disgusted: 0", a ratio of a probability value corresponding to each emotion label type to a sum of all probability values may be determined as the sampling rate of the emotion label type, to obtain a new emotion list "happy: 0.24, sad: 0.24, surprised: 0.38, touched: 0.14, disgusted: 0". The sound effect corresponding to the structural segment is sampled, based on the sampling rate. There is a 24% chance to sample a sound effect with a label "happy", a 24% chance to sample a sound effect with a label "sad", a 38% chance to sample a sound effect with a label "surprise", a 14% chance to sample a sound effect with a label "touched", and no chance to sample a sound effect with a label "disgusted". Combined with the preset number of sound effects (for example, three), it may be determined that an expected value of the sound effect with the label "happy" is 0.72, an expected value of the sound effect with the label "sad" is 0.72, an expected value of the sound effect with the label "surprised" is 1.14, an expected value of the sound effect with the label "touched" is 0.42, and an expected value of the sound effect with the label "disgusted" is 0.

In S28, the multiple target sound effects are added to an audio position corresponding to the structural segment in the audio file of the to-be-processed text.

For example, a time axis corresponding to the structural segment is "00:01:11~00:13:01". The target sound effects may be inserted into the time axis of the audio file. For example, the target sound effects may be inserted into any optional position, such as the beginning, the end and the middle, of the time axis. A specific insertion position is not limited in the embodiment of the present disclosure.

In an embodiment, the sound effect emotion label of the target sound effect may be matched with the emotion label type of each paragraph stored in the emotion list, so as to add the target sound effect to an audio file corresponding to a paragraph with the most matching emotion label.

In an embodiment, for each of the target sound effects, a sound effect length of the target sound effect may be determined, and a target paragraph with a text length matching the sound effect length of the target sound effect may be determined from the structural segment. The target sound effect is added to an audio position corresponding to the target paragraph in the audio file.

In an embodiment, the emotion list further includes a text length of each paragraph. In a process of determining the target sound effect, the structure label, the emotion label type of sound effect, a sound effect length, and a sound effect matching the text length of the paragraph corresponding to the determined and sampled emotion label type should all be considered. When a sound effect is added to the audio file, for each of the target sound effects, a paragraph with a text length matching the sound effect length of the target sound effect is determined, and the target sound effect is added to an audio position corresponding to the paragraph in the audio file.

Based on the above technical solutions, at least the following technical effects can be achieved.

Emotions of a whole text and each paragraph may be identified by an emotion determination model. The text is divided into structural segments. On the basis of an emotional cohesion of the structural segments, a sound effect may be determined for each paragraph, which is consistent with a full-text emotion and paragraph emotion. Therefore, the sound effect can be automatically selected and added, thus improving an efficiency of adding the sound effect. In this way, the sound effect can be added to the audio text in batches, and an atmosphere of the audio text can be improved.

Figure 3:
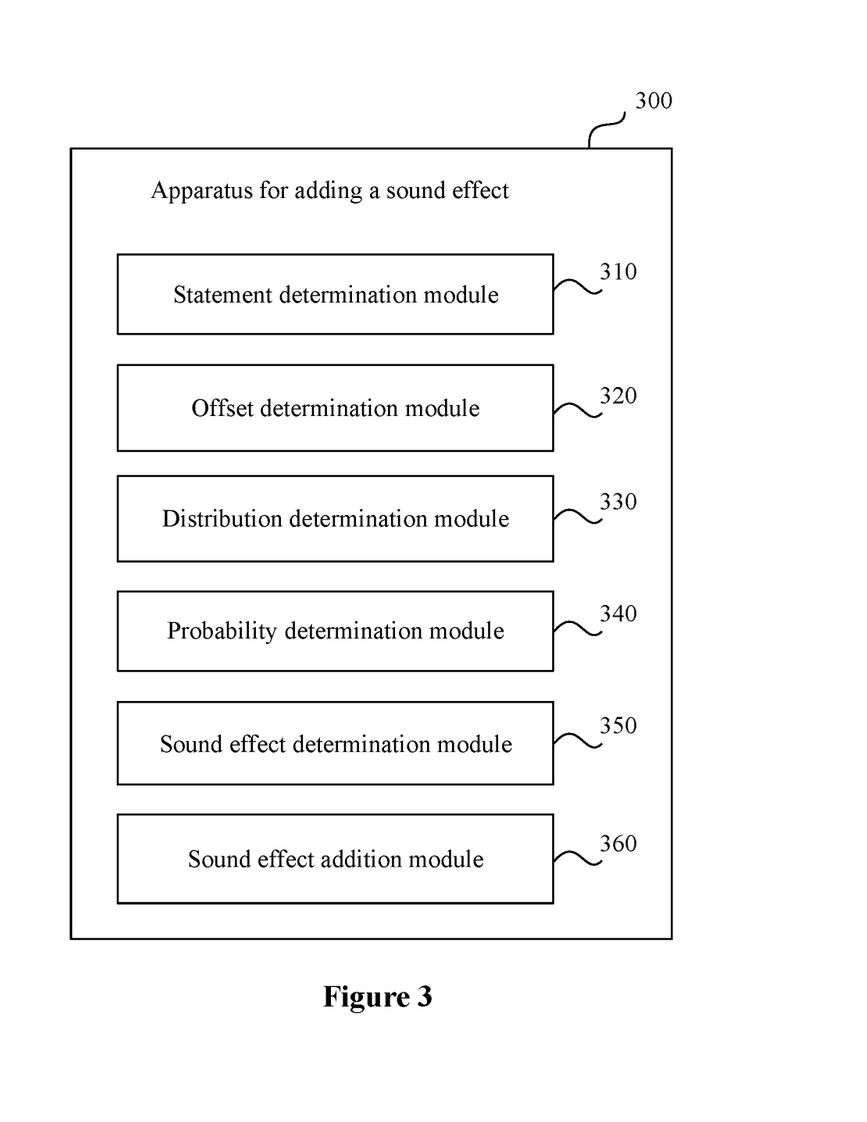
FIG. 3 is a block diagram of an apparatus for adding a sound effect according to an exemplary embodiment of the present disclosure.

FIG. 3 is a block diagram of an apparatus for adding a sound effect according to an exemplary embodiment of the present disclosure. As shown in FIG. 3, the apparatus 300 includes a statement determination module 310, an offset determination module 320, a distribution determination module 330, a probability determination module 340, a sound effect determination module 350, and a sound effect addition module 360.

The statement determination module 310 is configured to determine statement emotion labels of all statements in a to-be-processed text based on an emotion determination model.

The offset determination module 320 is configured to determine an emotion offset value of the to-be-processed text, based on an emotion label type with a largest number of the statement emotion labels.

The distribution determination module 330 is configured to determine, for each paragraph in the to-be-processed text, an emotion distribution vector of the paragraph based on the statement emotion label of at least one statement of the paragraph.

The probability determination module 340 is configured to determine an emotion probability distribution of the paragraph based on the emotion offset value and the emotion distribution vector of the paragraph.

The sound effect determination module 350 is configured to determine a target sound effect matching the paragraph based on the emotion probability distribution of the paragraph and sound effect emotion labels of multiple sound effects in a sound effect library.

The sound effect addition module 360 is configured to add the target sound effect to an audio position corresponding to the paragraph in an audio file of the to-be-processed text.

In an embodiment, the apparatus further includes a segmentation module configured to divide the to-be-processed text into multiple structural segments based on the number of emotion label types of the statement emotion labels and a preset number threshold, where the sound effects in the sound effect library are classified based on classifications of the structural segments; and a sound effect determination module configured to add, for each of the structural segments, a largest probability value in the emotion probability distribution of each paragraph in the structural segment and an emotion label type with the largest probability value into an emotion list of the structural segment; and determine multiple target sound effects matching the emotion list from a classification corresponding to the structural segment in the sound effect library based on the emotion list.

In an embodiment, each of the structural segments corresponds to a preset number of sound effects. The sound effect determination module is further configured to: on the basis of multiple emotion label types and probability values corresponding to the respective emotion label types in the emotion list, determine the multiple target sound effects from the classification corresponding to the structural segment in the sound effect library in a preset matching condition, where the number of target sound effects is equal to the preset number of sound effects.

In an embodiment, the probability determination module is configured to determine a target emotion distribution vector by superposing the emotion offset value with a score of an emotion label type corresponding to the emotion offset value in the emotion distribution vector of the paragraph; and convert the target emotion distribution vector into the emotion probability distribution of the paragraph in a preset conversion rule.

In an embodiment, the sound effect addition module is configured to add the multiple target sound effects to an audio position corresponding to the structural segment in the audio file of the to-be-processed text.

In an embodiment, the sound effect addition module is further configured to determine, for each of the target sound effects, a sound effect length of the target sound effect, and determine a target paragraph from the structural segment, where the target paragraph has a text length matching the sound effect length of the target sound effect; and add the target sound effect to an audio position corresponding to the target paragraph in the audio file.

In an embodiment, the emotion list further includes a text length of the paragraph, and an audio length of the target sound effect matches the text length of the paragraph. The sound effect addition module is further configured to determine, for each of the target sound effects, a paragraph with a text length matching the sound effect length of the target sound effect; and add the target sound effect to an audio position corresponding to the paragraph in the audio file.

Through the above technical solutions, at least the following technical effects can be achieved.

Emotions of a whole text and each paragraph may be identified by an emotion determination model. For each paragraph, a sound effect may be determined, which is consistent with the emotion of the whole text and the emotion of the paragraph. Therefore, the sound effect can be automatically selected and added, thus improving an efficiency of adding the sound effect. In this way, the sound effect can be added to the audio text in batches, and an atmosphere of the audio text can be improved.

The emotion determination model mentioned in the above embodiment may determine statement emotion labels of statements by words and word frequencies in the statements. The emotion determination model may be trained in the following ways.

A large number of texts are prepared, to hand them over to professional labeling personnel to label the texts with the statement emotion labels. A word segmentation model is used to segment the labeled texts to obtain a vocabulary. The vocabulary contains all the words and their word frequencies in each statement emotion label. A probability of each word in each emotion is calculated based on word frequencies and total word frequencies, and a probability variance of each word is calculated by the probability. A threshold is set. A word whose variance exceeds the threshold is recorded in a new vocabulary based on the probability. For a word segmentation result of the labeled text, multiple words which are ranked at the top of the vocabulary are selected from a target statement and statements preceding and following the target statement, to form a multi-dimensional word sequence. After the word sequence is vectorized, its position information and statement number in an original statement are added. The above vectorized result is determined as a model input feature during training and reasoning, and the manually labeled statement emotion labels are determined as learning objectives to train the emotion determination model. Therefore, the emotion determination model may determine the emotion labels of statements through the words and word frequencies in the statements.

Figure 4:
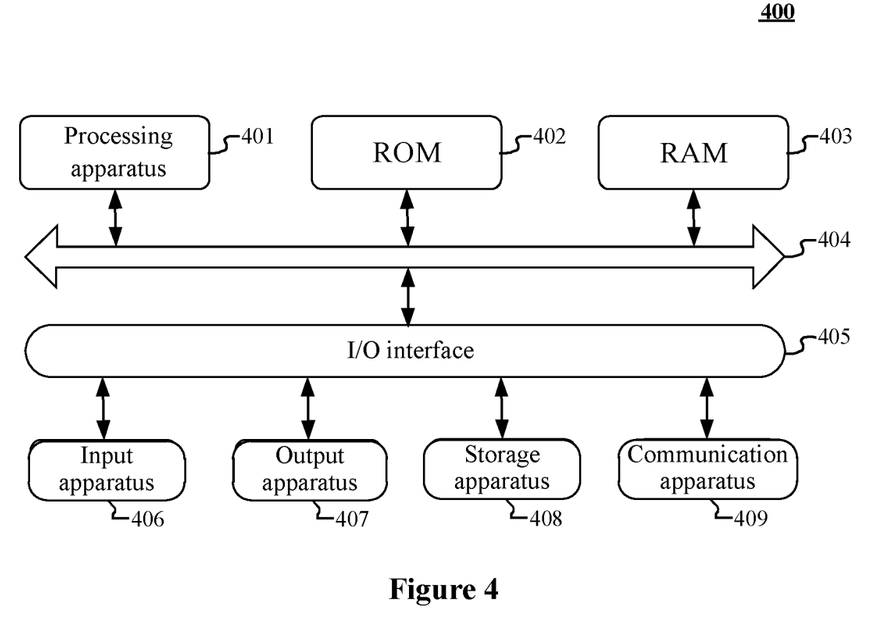
FIG. 4 is a block diagram of an electronic device according to an exemplary embodiment of the present disclosure.

Reference is made to FIG. 4, which is a schematic structural diagram of an electronic device (e.g., the terminal device or the server in FIG. 1) 400 suitable for implementing the embodiments of the present disclosure. The terminal device according to the embodiments of the present disclosure may include, but is not limited to, mobile phones, laptops, digital broadcast receivers, PDAs (personal digital assistants), PADs (tablets), PMPs (portable multimedia players), vehicle-mounted terminals (such as in-vehicle navigation terminals) and other mobile terminals and fixed terminals such as digital TVs and desktop computers. The electronic device shown in FIG. 4 is only exemplary, and should not indicate any limitation to the function and scope of application of the embodiments of the present disclosure.

As shown in FIG. 4, the electronic device 400 may include a processing apparatus 401, such as a central processing unit (CPU) or a graphics processor, which may execute various operations and processing based on a program stored in a read only memory (ROM) 402 or a program loaded from a storage apparatus 408 into a random access memory (RAM) 403. The RAM 403 is further configured to store various programs and data required by the electronic device 400 to perform an operation. The processing apparatus 401, the ROM 402 and the RAM 403 are connected to each other through a bus 404. An input/output (I/O) interface 405 is also connected to the bus 404.

Generally, the I/O interface 405 may be connected to: an input apparatus 406, such as a touch screen, a touch panel, a keyboard, a mouse, a camera, a microphone, an accelerometer, and a gyroscope; an output apparatus 407, such as a liquid crystal display (LCD), a speaker, and a vibrator; a storage apparatus 408 such as a magnetic tape and a hard disk; and a communication apparatus 409. The communication apparatus 409 enables wireless or wired communication between the electronic device 400 and other devices for data exchanging. Although FIG. 4 shows an electronic device 400 having various components, it should be understood that the illustrated components are not necessarily required to all be implemented or included. Alternatively, more or fewer components may be implemented or included.

Particularly, according to the embodiments of the present disclosure, the processes described above with reference to flowcharts may be implemented as a computer software program. For example, a computer program product is further provided as an embodiment in the present disclosure, including a computer program carried on a non-transitory computer readable medium. The computer program includes program codes for performing the method shown in the flowchart. In the embodiment, the computer program may be downloaded and installed from the network via the communication apparatus 409, or installed from the storage apparatus 408, or installed from the ROM 402. When the computer program is executed by the processing apparatus 401, the functions defined in the method according to the embodiment of the present disclosure are performed It is to be noted that, the computer readable medium mentioned in the embodiments of the present disclosure may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a Random Access Memory (RAM), a Read Only Memory (ROM), an Erasable Programmable Read Only Memory (EPROM or flash memory), an optical fiber, a portable compact disc read only memory (CD-ROM), a light storage device, a magnetic storage device or any proper combination thereof. In the embodiments of the present disclosure, the computer readable storage medium may be any tangible medium containing or storing a program, and the program may be used by or in combination with an instruction execution system, apparatus, or device. In the embodiments of the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and may send, propagate or transmit programs to be used by or in combination with an instruction execution system, apparatus or device. The program codes stored in the computer readable medium may be transmitted via any proper medium including but not limited to: a wire, an optical cable, radio frequency (RF) and the like, or any proper combination thereof.

In some embodiments, the client and the server can communicate using any currently known or future developed network protocol such as HyperText Transfer Protocol (HTTP), and can be interconnected with any form or medium of digital data communication (e.g., a communication network). Examples of a communication network include a local area network ("LAN"), a wide area network ("WAN"), the Internet Work (e.g., the Internet), and a peer-to-peer network (e.g., an ad hoc peer-to-peer network), as well as any currently known or future developed network.

The computer readable medium may be incorporated in the electronic device, or may exist alone without being assembled into the electronic device.

The computer readable medium carries one or more programs. The one or more programs, when executed by the electronic device, cause the electronic device to: acquire at least two Internet Protocol addresses; send a node evaluation request including the at least two Internet Protocol addresses to a node evaluation device, where the node evaluation device selects an Internet Protocol address from the at least two Internet Protocol addresses and returns the selected Internet Protocol address; and receive the Internet Protocol address returned by the node evaluation device, where the acquired Internet Protocol address indicates an edge node in a content distribution network.

Alternatively, the computer readable medium carries one or more programs. The one or more programs, when executed by the electronic device, cause the electronic device to: receive a node evaluation request including at least two Internet Protocol addresses; select an Internet Protocol address from the at least two Internet Protocol addresses; and return the selected Internet Protocol address, where the received Internet Protocol address indicates an edge node in a content distribution network.

The computer program code for performing the operations disclosed in the embodiments of the present disclosure may be written in one or more programming languages or combinations thereof. The programming languages include but not limited to an object-oriented programming language, such as Java, Smalltalk, and C++, and a conventional procedural programming language, such as C language or a similar programming language. The program code may be executed entirely on a user computer, partially on the user computer, as an standalone software package, partially on the user computer and partially on a remote computer, or entirely on the remote computer or a server. In a case involving a remote computer, the remote computer may be connected to a user computer or an external computer through any kind of network including local area network (LAN) or wide area network (WAN). For example, the remote computer may be connected through Internet connection by an Internet service provider.

Flowcharts and block diagrams in the drawings illustrate the architecture, functions and operations that may be implemented by the system, method and computer program produce according to the embodiments of the present disclosure. In this regard, each block in the flowcharts or the block diagrams may represent a module, a program segment, or a part of code. The module, the program segment, or the part of code contains one or more executable instructions for implementing the specified logical function. It should be also noted that, in some alternative implementations, the functions shown in the blocks may be performed in an order different from the order shown in the drawings. For example, two blocks shown in succession may actually be executed in parallel, or sometimes may be executed in a reverse order, which depends on the functions involved. It should also be noted that, each block in the block diagrams and/or the flowcharts and a combination of blocks in the block diagrams and/or the flowcharts may be implemented by a dedicated hardware-based system performing specified functions or operations, or may be implemented by a combination of dedicated hardware and computer instructions.

The modules mentioned in the description of the embodiments of the present disclosure may be implemented by means of software, or otherwise by means of hardware. In some circumstances, the name of the module does not constitute a limitation on the module itself. For example, the first acquisition module may also be described as "a module for acquiring at least two Internet Protocol addresses".

The functions described herein above may be executed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and the like.

In the context of the embodiments of the present disclosure, a machine readable medium may be a tangible medium that may contain or store a program to be used by or in combination with an instruction execution system, apparatus or device. The machine readable medium may be a machine readable signal medium or a machine readable storage medium. The machine readable medium may include, but is not limited to, a system, an apparatus, or a device in an electronic, magnetic, optical, electromagnetic, infrared, or semi-conductive form, or any proper combination thereof. The machine readable storage medium may include an electrical connection based on one or more wires, a portable computer disk, a hard disk, a Random Access Memory (RAM), a Read Only Memory (ROM), an Erasable Programmable Read Only Memory (EPROM or flash memory), an optical fiber, a portable compact disc read only memory (CD-ROM), a light storage device, a magnetic storage device or any proper combination thereof.

According to one or more embodiments of the present disclosure, a method for adding a sound effect is provided according to a first example. The method includes: determining statement emotion labels of all statements in a to-be-processed text based on an emotion determination model; determining an emotion offset value of the to-be-processed text based on an emotion label type with a largest number of the statement emotion labels; determining, for each paragraph in the to-be-processed text, an emotion distribution vector of the paragraph based on the statement emotion label of at least one statement of the paragraph; determining an emotion probability distribution of the paragraph based on the emotion offset value and the emotion distribution vector of the paragraph; determining a target sound effect matching the paragraph based on the emotion probability distribution of the paragraph and sound effect emotion labels of multiple sound effects in a sound effect library; and adding the target sound effect to an audio position corresponding to the paragraph in an audio file of the to-be-processed text.

According to one or more embodiments of the present disclosure, the method of the first example is provided according to a second example. The method further includes: dividing the to-be-processed text into multiple structural segments based on the number of emotion label types of the statement emotion labels and a preset number threshold, where the sound effects in the sound effect library are classified based on classifications of the structural segments; and the determining a target sound effect matching the paragraph based on the emotion probability distribution of the paragraph and sound effect emotion labels of multiple sound effects in a sound effect library includes: adding, for each of the structural segments, a largest probability value in the emotion probability distribution of each paragraph in the structural segment and an emotion label type with the largest probability value into an emotion list of the structural segment; and determining multiple target sound effects matching the emotion list from a classification corresponding to the structural segment in the sound effect library, based on the emotion list.

According to one or more embodiments of the present disclosure, the method of the second example is provided according to a third example. Each of the structural segments corresponds to a preset number of sound effects. The determining multiple target sound effects matching the emotion list from a classification corresponding to the structural segment in the sound effect library based on the emotion list includes: on the basis of multiple emotion label types and probability values corresponding to respective emotion label types in the emotion list, determining the multiple target sound effects from the classification corresponding to the structural segment in the sound effect library in a preset matching condition, where the number of target sound effects is equal to the preset number of sound effects.

According to one or more embodiments of the present disclosure, the method of the first to third examples is provided according to a fourth example. The determining an emotion probability distribution of the paragraph based on the emotion offset value and the emotion distribution vector of the paragraph includes: determining a target emotion distribution vector by superposing the emotion offset value with a score of an emotion label type corresponding to the emotion offset value in the emotion distribution vector of the paragraph; and converting the target emotion distribution vector into the emotion probability distribution of the paragraph in a preset conversion rule.

According to one or more embodiments of the present disclosure, the method of the second or third example is provided according to a fifth example. The adding the target sound effect to an audio position corresponding to the paragraph in an audio file of the to-be-processed text includes: adding the multiple target sound effects to an audio position corresponding to the structural segment in the audio file of the to-be-processed text.

According to one or more embodiments of the present disclosure, the method of the fifth example is provided according to a sixth example. The adding the multiple target sound effects to an audio position corresponding to the structural segment in the audio file of the to-be-processed text includes: determining, for each of the target sound effects, a sound effect length of the target sound effect; determining a target paragraph from the structural segment, where the target paragraph has a text length matching the sound effect length of the target sound effect; and adding the target sound effect to an audio position corresponding to the target paragraph in the audio file.

According to one or more embodiments of the present disclosure, the method of the fifth example is provided according to a seventh example. The emotion list further includes a text length of the paragraph, and an audio length of the target sound effect matches the text length of the paragraph. The adding the target sound effect to an audio position corresponding to the paragraph in an audio file of the to-be-processed text includes: determining, for each of the target sound effects, a paragraph with a text length matching the sound effect length of the target sound effect; and adding the target sound effect to an audio position corresponding to the paragraph in the audio file.

According to one or more embodiments of the present disclosure, an apparatus for adding a sound effect is provided according to an eighth example. The apparatus includes a statement determination module, an offset determination module, a distribution determination module, a probability determination module, a sound effect determination module, and a sound effect addition module. The statement determination module is configured to determine statement emotion labels of all statements in a to-be-processed text based on an emotion determination model. The offset determination module is configured to determine an emotion offset value of the to-be-processed text based on an emotion label type with a largest number of the statement emotion labels. The distribution determination module is configured to determine, for each paragraph in the to-be-processed text, an emotion distribution vector of the paragraph based on the statement emotion label of at least one statement of the paragraph. The probability determination module is configured to determine an emotion probability distribution of the paragraph based on the emotion offset value and the emotion distribution vector of the paragraph. The sound effect determination module is configured to determine a target sound effect matching the paragraph based on the emotion probability distribution of the paragraph and sound effect emotion labels of multiple sound effects in a sound effect library. The sound effect addition module is configured to add the target sound effect to an audio position corresponding to the paragraph in an audio file of the to-be-processed text.

According to one or more embodiments of the present disclosure, the apparatus of the eighth example is provided according to a ninth example. The apparatus further includes a segmentation module and the sound effect determination module. The segmentation module is configured to divide the to-be-processed text into multiple structural segments based on the number of emotion label types of the statement emotion labels and a preset number threshold, where the sound effects in the sound effect library are classified based on classifications of the structural segments. The sound effect determination module is configured to add, for each of the structural segments, a largest probability value in the emotion probability distribution of each paragraph in the structural segment and an emotion label type with the largest probability value into an emotion list of the structural segment; and determine multiple target sound effects matching the emotion list from a classification corresponding to the structural segment in the sound effect library based on the emotion list.

According to one or more embodiments of the present disclosure, the apparatus of the ninth example is provided according to a tenth example. Each of the structural segments further corresponds to a preset number of sound effects. The sound effect determination module is further configured to: on the basis of multiple emotion label types and probability values corresponding to respective emotion label types in the emotion list, determine the multiple target sound effects from the classification corresponding to the structural segment in the sound effect library in a preset matching condition, where the number of target sound effects is equal to the preset number of sound effects.

According to one or more embodiments of the present disclosure, the apparatus of the eighth to tenth examples is provided according to an eleventh example. The probability determination module is configured to determine a target emotion distribution vector by superposing the emotion offset value with a score of an emotion label type corresponding to the emotion offset value in the emotion distribution vector of the paragraph; and convert the target emotion distribution vector into the emotion probability distribution of the paragraph in a preset conversion rule.

According to one or more embodiments of the present disclosure, the apparatus of the ninth or tenth example is provided according to a twelfth example. The sound effect addition module is configured to add the multiple target sound effects to an audio position corresponding to the structural segment in the audio file of the to-be-processed text.

According to one or more embodiments of the present disclosure, the apparatus of the twelfth example is provided according to a thirteenth example. The sound effect addition module is further configured to determine, for each of the target sound effects, a sound effect length of the target sound effect; determine a target paragraph from the structural segment, where the target paragraph has a text length matching the sound effect length of the target sound effect; and add the target sound effect to an audio position corresponding to the target paragraph in the audio file.

According to one or more embodiments of the present disclosure, the apparatus of the twelfth example is provided according to the fourteenth example. The emotion list further includes a text length of the paragraph, and an audio length of the target sound effect matches the text length of the paragraph. The sound effect addition module is further configured to determine, for each of the target sound effects, a paragraph with a text length matching the sound effect length of the target sound effect; and add the target sound effect to an audio position corresponding to the paragraph in the audio file.

The above descriptions are only preferred embodiments of the present disclosure and explanations of the technical principles used in the present disclosure. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, the scope of the present disclosure may cover a technical solution formed by replacing the features described above with technical features with similar functions disclosed in (but not limited to) the present disclosure.

In addition, although the above operations are described in a specific order, it should not be understood that these operations are required to be performed in the specific order or performed in a sequential order. In some conditions, multitasking and parallel processing may be advantageous. Similarly, although multiple implementation details are included in the above descriptions, the details should not be interpreted as limitations to the scope of the present disclosure. Some features described in an embodiment may be implemented in combination in another embodiment. In addition, the features described in an embodiment may be implemented individually or in any suitable sub-combination form in multiple embodiments.

Although the subject of the present disclosure has been described according to the structural features and/or logical actions of the method, it should be understood that the subject defined in the claims is not necessarily limited to the features or actions described above. The specific features and actions described above are only examples of the implementation of the claims. For the apparatus according to the embodiments described above, the manners in which the modules perform operations have been described in detail in the method embodiments, and the manners are not described in detail herein.

The invention claimed is:

1. A method for adding a sound effect, comprising:
   determining statement emotion labels of all statements in a to-be-processed text based on an emotion determination model;
   determining an emotion offset value of the to-be-processed text, based on an emotion label type with a largest number of the statement emotion labels;
   determining, for each paragraph in the to-be-processed text, an emotion distribution vector of the paragraph based on the statement emotion label of at least one statement of the paragraph;
   determining an emotion probability distribution of the paragraph based on the emotion offset value and the emotion distribution vector of the paragraph;
   determining a target sound effect matching the paragraph, based on the emotion probability distribution of the paragraph and sound effect emotion labels of a plurality of sound effects in a sound effect library; and
   adding the target sound effect to an audio position corresponding to the paragraph in an audio file of the to-be-processed text.

2. The method according to claim 1, further comprising:
   dividing the to-be-processed text into a plurality of structural segments based on the number of emotion label types of the statement emotion labels and a preset number threshold, wherein the sound effects in the sound effect library are classified based on classifications of the structural segments; and
   the determining a target sound effect matching the paragraph based on the emotion probability distribution of the paragraph and sound effect emotion labels of a plurality of sound effects in a sound effect library comprises:
      adding, for each of the structural segments, a largest probability value in the emotion probability distribution of each paragraph in the structural segment and an emotion label type with the largest probability value, into an emotion list of the structural segment; and
      determining a plurality of target sound effects matching the emotion list from a classification corresponding to the structural segment in the sound effect library based on the emotion list.

3. The method according to claim 2, wherein each of the structural segments corresponds to a preset number of sound effects;
   the determining a plurality of target sound effects matching the emotion list from a classification corresponding to the structural segment in the sound effect library based on the emotion list comprises:
      determining the plurality of target sound effects from the classification corresponding to the structural segment in the sound effect library in a preset matching condition, based on a plurality of emotion label types and probability values corresponding to respective emotion label types in the emotion list, wherein the number of target sound effects is equal to the preset number of sound effects.

4. The method according to claim 1, wherein the determining an emotion probability distribution of the paragraph based on the emotion offset value and the emotion distribution vector of the paragraph comprises:
   determining a target emotion distribution vector by superposing the emotion offset value with a score of an emotion label type corresponding to the emotion offset value in the emotion distribution vector of the paragraph; and
   converting the target emotion distribution vector into the emotion probability distribution of the paragraph in a preset conversion rule.

5. The method according to claim 2, wherein the adding the target sound effect to an audio position corresponding to the paragraph in an audio file of the to-be-processed text comprises:
   adding the plurality of target sound effects to the audio position corresponding to the structural segment in the audio file of the to-be-processed text.

6. The method according to claim 5, wherein the adding the plurality of target sound effects to the audio position corresponding to the structural segment in the audio file of the to-be-processed text comprises:
   determining, for each of the target sound effects, a sound effect length of the target sound effect; and determining a target paragraph from the structural segment, wherein the target paragraph has a text length matching the sound effect length of the target sound effect; and
   adding the target sound effect to the audio position corresponding to the target paragraph in the audio file.

7. The method according to claim 5, wherein the emotion list further comprises a text length of the paragraph, and an audio length of the target sound effect matches the text length of the paragraph; and
   the adding the target sound effect to an audio position corresponding to the paragraph in an audio file of the to-be-processed text comprises:
      determining, for each of the target sound effects, a paragraph with a text length matching the sound effect length of the target sound effect; and adding the target sound effect to an audio position corresponding to the paragraph in the audio file.

8. A non-transitory computer readable medium storing a computer program thereon, wherein the program, when executed by a processing apparatus, causes the processing apparatus to:
determine statement emotion labels of all statements in a to-be-processed text based on an emotion determination model;
determine an emotion offset value of the to-be-processed text, based on an emotion label type with a largest number of the statement emotion labels;
determine, for each paragraph in the to-be-processed text, an emotion distribution vector of the paragraph based on the statement emotion label of at least one statement of the paragraph;
determine an emotion probability distribution of the paragraph based on the emotion offset value and the emotion distribution vector of the paragraph;
determine a target sound effect matching the paragraph, based on the emotion probability distribution of the paragraph and sound effect emotion labels of a plurality of sound effects in a sound effect library; and
add the target sound effect to an audio position corresponding to the paragraph in an audio file of the to-be-processed text.

9. An electronic device, comprising:
a storage apparatus storing a computer program, and
a processing apparatus configured to execute the computer program in the storage apparatus to;
determine statement emotion labels of all statements in a to-be-processed text based on an emotion determination model;
determine an emotion offset value of the to-be-processed text, based on an emotion label type with a largest number of the statement emotion labels;
determine, for each paragraph in the to-be-processed text, an emotion distribution vector of the paragraph based on the statement emotion label of at least one statement of the paragraph;
determine an emotion probability distribution of the paragraph based on the emotion offset value and the emotion distribution vector of the paragraph;
determine a target sound effect matching the paragraph, based on the emotion probability distribution of the paragraph and sound effect emotion labels of a plurality of sound effects in a sound effect library; and
add the target sound effect to an audio position corresponding to the paragraph in an audio file of the to-be-processed text.

10. The electronic device according to claim 9, wherein the computer program, when executed by the processing apparatus, causes the processing apparatus to:
divide the to-be-processed text into a plurality of structural segments based on the number of emotion label types of the statement emotion labels and a preset number threshold, wherein the sound effects in the sound effect library are classified based on classifications of the structural segments;
add, for each of the structural segments, a largest probability value in the emotion probability distribution of each paragraph in the structural segment and an emotion label type with the largest probability value, into an emotion list of the structural segment; and determine a plurality of target sound effects matching the emotion list from a classification corresponding to the structural segment in the sound effect library based on the emotion list.

11. The electronic device according to claim 10, wherein each of the structural segments corresponds to a preset number of sound effects; and
wherein the computer program, when executed by the processing apparatus, causes the processing apparatus to:
determine the plurality of target sound effects from the classification corresponding to the structural segment in the sound effect library in a preset matching condition, based on a plurality of emotion label types and probability values corresponding to respective emotion label types in the emotion list, wherein the number of target sound effects is equal to the preset number of sound effects.

12. The electronic device according to claim 9, wherein the computer program, when executed by the processing apparatus, causes the processing apparatus to:
determine a target emotion distribution vector by superposing the emotion offset value with a score of an emotion label type corresponding to the emotion offset value in the emotion distribution vector of the paragraph; and
convert the target emotion distribution vector into the emotion probability distribution of the paragraph in a preset conversion rule.

13. The electronic device according to claim 10, wherein the computer program, when executed by the processing apparatus, causes the processing apparatus to:
add the plurality of target sound effects to the audio position corresponding to the structural segment in the audio file of the to-be-processed text.

14. The electronic device according to claim 13, wherein the computer program, when executed by the processing apparatus, causes the processing apparatus to:
determine, for each of the target sound effects, a sound effect length of the target sound effect; and determine a target paragraph from the structural segment, wherein the target paragraph has a text length matching the sound effect length of the target sound effect; and
add the target sound effect to the audio position corresponding to the target paragraph in the audio file.

15. The electronic device according to claim 13, wherein the emotion list further comprises a text length of the paragraph, and an audio length of the target sound effect matches the text length of the paragraph; and
wherein the computer program, when executed by the processing apparatus, causes the processing apparatus to:
determine, for each of the target sound effects, a paragraph with a text length matching the sound effect length of the target sound effect; and add the target sound effect to an audio position corresponding to the paragraph in the audio file.

16. The non-transitory computer readable medium according to claim 8, wherein the computer program, when executed by the processing apparatus, causes the processing apparatus to:
divide the to-be-processed text into a plurality of structural segments based on the number of emotion label types of the statement emotion labels and a preset number threshold, wherein the sound effects in the sound effect library are classified based on classifications of the structural segments;

add, for each of the structural segments, a largest probability value in the emotion probability distribution of each paragraph in the structural segment and an emotion label type with the largest probability value, into an emotion list of the structural segment; and determine a plurality of target sound effects matching the emotion list from a classification corresponding to the structural segment in the sound effect library based on the emotion list.

17. The non-transitory computer readable medium according to claim 16, wherein each of the structural segments corresponds to a preset number of sound effects; and wherein the computer program, when executed by the processing apparatus, causes the processing apparatus to:

determine the plurality of target sound effects from the classification corresponding to the structural segment in the sound effect library in a preset matching condition, based on a plurality of emotion label types and probability values corresponding to respective emotion label types in the emotion list, wherein the number of target sound effects is equal to the preset number of sound effects.

18. The non-transitory computer readable medium according to claim 8, wherein the computer program, when executed by the processing apparatus, causes the processing apparatus to:

determine a target emotion distribution vector by superposing the emotion offset value with a score of an emotion label type corresponding to the emotion offset value in the emotion distribution vector of the paragraph; and convert the target emotion distribution vector into the emotion probability distribution of the paragraph in a preset conversion rule.

19. The non-transitory computer readable medium according to claim 16, wherein the computer program, when executed by the processing apparatus, causes the processing apparatus to:

add the plurality of target sound effects to the audio position corresponding to the structural segment in the audio file of the to-be-processed text.

20. The non-transitory computer readable medium according to claim 19, wherein the computer program, when executed by the processing apparatus, causes the processing apparatus to:

determine, for each of the target sound effects, a sound effect length of the target sound effect; and determine a target paragraph from the structural segment, wherein the target paragraph has a text length matching the sound effect length of the target sound effect; and add the target sound effect to the audio position corresponding to the target paragraph in the audio file.

\* \* \* \* \*